United States Patent [19]

Qian

[11] Patent Number: 5,381,791
[45] Date of Patent: Jan. 17, 1995

[54] AUTOMATIC INDENTIFICATION OF ANATOMICAL FEATURES OF INTEREST FROM DATA ACQUIRED IN NUCLEAR MEDICINE STUDIES AND AUTOMATIC POSITIONING OF SCINTILLATION CAMERAS TO CARRY OUT SUCH STUDIES AT OPTIMAL POSITIONS

[75] Inventor: Jianzhong Qian, Hoffman Estates, Ill.

[73] Assignee: Siemens Medical Systems, Inc., Iselin, N.J.

[21] Appl. No.: 848,769

[22] Filed: Mar. 10, 1992

[51] Int. Cl.$^6$ ............................................. A61B 6/00
[52] U.S. Cl. ............................ 128/659; 128/653.1; 382/6; 378/20; 250/362; 250/363.1
[58] Field of Search ................... 128/653.1, 654, 659; 382/6, 26; 378/20, 62; 250/363.01, 363.02, 363.10, 362

[56] References Cited

U.S. PATENT DOCUMENTS

| | | | |
|---|---|---|---|
| 3,979,594 | 9/1976 | Anger | 250/369 |
| 4,101,961 | 7/1978 | Reiber | 382/6 |
| 4,183,013 | 1/1980 | Agrawala et al. | 382/26 |
| 4,298,944 | 11/1981 | Stoub et al. | 382/6 |
| 4,404,973 | 9/1983 | Lancaster et al. | 128/654 |
| 4,497,024 | 1/1985 | Roth | 128/659 |
| 4,538,299 | 8/1985 | DeForest | 382/6 |
| 4,780,823 | 10/1988 | Stoub et al. | 364/413.13 |
| 4,849,638 | 7/1989 | Hawman | 250/363.1 |
| 4,922,915 | 5/1990 | Arnold et al. | 128/653.1 |
| 5,036,463 | 7/1991 | Abela et al. | 364/413.13 |
| 5,165,410 | 11/1992 | Warne et al. | 128/653.1 |
| 5,188,111 | 2/1993 | Yates et al. | 128/662.06 |

FOREIGN PATENT DOCUMENTS 0389968 3/1990 European Pat. Off. .
4-90076 8/1990 Japan .

OTHER PUBLICATIONS

Patrick T. Cahill and R. James R. Knowles, Software Reliability and Algorithm . . . , Medical Physics, vol. 12, No. 5, pp. 575–480 (Oct., 1985).
Niemann, Bunke, Hofmann, Sagerer, Wolf & Feistel, A Knowledge Based System . . . , IEEE Transactions, vol. 7, No. 3, pp. 246–259 (May, 1985).
J. E. Boyd & R. A. Stein, Edge Enhancement in Medical Images by 3D Processing, Proceeding of the 1986 IEEE International Conference, pp. 211–215 (Oct. 14–17, 1986).
Eric G. Hawman, Digital Boundary Detection Techniques for the Analysis of . . . , Optical Engineering, vol. 20, No. 5, pp. 719–725 (Oct. 1981).
EPO Search Report enclosed with Invitation dated Mar. 16, 1993.
Proceedings of the IEEE Engineering in Medicine and Biology Society (Nov. 9–12, 1989), pp. 578–579, Boire, Cauvin, Maublant & Veyre.
Computers in Cardiology, (Sep. 12–15, 1987), pp. 191–194, Sanz, Anselmo, Simon and LeFree.

*Primary Examiner*—Lee S. Cohen
*Assistant Examiner*—Brian L. Casler
*Attorney, Agent, or Firm*—Mark H. Jay

[57] ABSTRACT

A nuclear medicine image is scanned and pixels of maximum and minimum intensity are identified and correlated with each other using constraints which are empirically determined to relate to the feature of interest (such as the heart). The information thus obtained is used to define a region of interest in which an anatomical feature of interest may be located, and to position a scintillation camera detector to carry out a nuclear medicine study at optimal positions.

19 Claims, 14 Drawing Sheets

INTERVENTRICULAR SEPTUM

INTERVENTRICULAR SEPTUM

INTERVENTRICULAR SEPTUM

AUTOMATIC INDENTIFICATION OF ANATOMICAL FEATURES OF INTEREST FROM DATA ACQUIRED IN NUCLEAR MEDICINE STUDIES AND AUTOMATIC POSITIONING OF SCINTILLATION CAMERAS TO CARRY OUT SUCH STUDIES AT OPTIMAL POSITIONS

BACKGROUND OF THE INVENTION

The invention relates to nuclear medicine, and more particularly relates to images produced by nuclear medicine studies. In its most immediate sense, the invention relates to nuclear medicine studies of organs, particularly studies of the heart.

Other modalities, such as computed tomography and magnetic resonance imaging, produce clearly defined images. However, in nuclear medicine studies, e.g. cardiac bloodpool studies (which are more concerned with functional determinations such as ejection fractions rather than location of malignant regions as in other studies) it is necessary to identify such organ features as the interventricular septum, the left ventricle and the right ventricle. Since cardiac tissue is engorged with blood and the tissue adjoins blood pools within the heart, there are no sharp edges (as exist with images produced by other modalities) and even under the best of circumstances it is difficult to locate exactly that portion of the image which relates to, e.g., the left ventricle.

Attempts have been made to use edge detection methods to identify where anatomic features are located, but such attempts have been unsuccessful. This is because the data used to construct such images is contaminated by scatter and attenuation. Additionally, nuclear medicine images become even more ambiguous because of low resolution, low signal-to-noise ratio and the presence of radioactivity from adjacent organs and background tissue. Consequently, conventional detection methods are not helpful in identifying anatomical structures of interest; these methods may locate an edge which is without diagnostic significance and may overlook an edge which is highly important.

Additionally, it frequently happens that the camera is mispositioned with respect to the patient's target organ (i.e. the organ of interest). (This may happen where the patient has, e.g., an abnormally oriented heart, or where the patient shifts position after being positioned properly.) Even an experienced technician needs substantial time to collect enough data to assess the positioning of the patient and to correct any mispositioning, and an inexperienced technician may need to repeat these steps one or more times before the patient is positioned properly. Worse, if the mispositioning is not detected and a study has been conducted with the patient in a suboptimal position, the diagnostician is forced to choose between using the resulting suboptimal study (which is of diminished diagnostic utility) or repeating it (and thereby dosing the patient once again and decreasing throughput through the camera).

It would therefore be advantageous to provide method and apparatus which would be capable of automatically identifying anatomic features in nuclear medicine images for the target organ in nuclear medicine studies even where the target organ is not sharply defined.

It would also be advantageous to provide method and apparatus which could automatically identify the camera positioning between the patient's target organ and the camera detector far in advance of the end of the study, thereby permitting manual or even automatic repositioning of the camera head to an optimal position.

One object of the invention is to provide method and apparatus which can identify anatomic features in nuclear medicine images of target organs.

Another object of the invention is to provide method and apparatus which can automatically identify anatomic landmarks in nuclear medicine images, even when the images contain insufficient data to be diagnostically useful.

A further object of the invention is to provide method and apparatus which will permit automatic positioning of the scintillation camera detector.

Still another object is, in general, to improve on known methods and apparatus used in nuclear medicine.

The invention proceeds from the realization that conventional edge detection methods are unsuitable for use in nuclear medicine images. This is because such methods do not incorporate any anatomy-specific constraints and therefore cannot distinguish between patterns having diagnostic significance and patterns which lack diagnostic significance. Additionally, because nuclear medicine images of tissue are not sharply focussed even under the best of circumstances, it is difficult for edge detection methods to produce meaningful edge curves.

However, it is possible to take advantage of a basic characteristic of nuclear medicine in order to locate anatomical landmarks. In a nuclear medicine study, the uptake of a radioactive isotope determines the intensity of the nuclear medicine image and there are no shadows, reflections, or artificial highlights. Therefore, segments of maximum and minimum intensity will in certain instances be intrinsic to the patient's anatomy and will be unaffected by changes in imaging conditions. As a result, it is possible to utilize the relative locations of such maxima and minima in order to locate anatomical landmarks.

In accordance with the invention, a nuclear medicine image is scanned line by line. For the intensity profile of each scan line, local curvatures are computed to identify local intensity maxima and local intensity minima. After the whole image has been so processed, line segments are constructed from all identified local intensity maxima, and other line segments are constructed from all identified local intensity minima. Then, these line segments are evaluated to see whether they satisfy constraints which are specific to the anatomical region of interest. If so, the line segments are treated as identifying particular anatomical landmarks, and on the basis of these landmarks, boundaries for the target organ or the portion of interest of the target organ can be easily located.

For example, if a cardiac image shows the left and right ventricles separated by the interventricular septum, there will be line segments constructed from pixels of maximum intensity near the long axis of each ventricle and there will be a line segment constructed from pixels of minimum intensity running near the interventricular septum and between the two line segments of maximum intensity. Furthermore, this "maximum-minimum-maximum" pattern will have a certain spatial relationship which is dictated by the structure of the heart. Therefore, "maximum-minimum-maximum" patterns which are heart-related can be distinguished from similar patterns which are not heart-related. Consequently, a computer can be programmed to scan a cardiac gated blood pool image and to draw the above-mentioned line segments (anatomical landmarks).

It is possible, in accordance with the invention, to more easily deduce the boundaries of the ventricles of the heart from the above-mentioned line segments because there are certain geometrical relationships which are intrinsic to the heart and the boundaries can be expected to lie within regions which can be defined by these anatomical landmarks. It is therefore possible to limit the identifications of anatomical features of interest to comparatively small regions which exclude anatomical structures that are not of interest.

Furthermore, because the referenced "maximum-minimum-maximum" pattern is dictated by the structure of the heart, that pattern exists at all stages of image acquisition even if there is insufficient data to form an image which would be diagnostically useful. There is a one-to-one relationship between the detected landmark pattern and the camera position. Thus, even after a relatively short time, the position of the camera detector with respect to the patient's target organ can be inferred from the relative positioning of the above-mentioned line segments. From this, it can be determined whether the camera has been properly positioned and how the camera should be repositioned; this permits the camera to be repositioned so that a study is not conducted at a suboptimal angle.

Additionally, a camera with a motor-driven gantry can be adapted to automatically position itself to an optimal position. With such a gantry, the camera detector can be stepped around the patient at small angular increments (each step position is known as a camera stop), with one frame of information being acquired at each position. In further accordance with the invention, after relevant frames of information have been scanned, the inferred camera position is registered.

BRIEF DESCRIPTION OF THE DRAWINGS

The invention will be better understood with reference to the following illustrative and non-limiting drawings, in which.

DETAILED DESCRIPTION OF PREFERRED EMBODIMENTS

Although the invention will be described below in connection with a cardiac bloodpool study, it will be understood that this is merely an exemplary application. The invention can be adapted to other applications by persons skilled in the art.

In a conventional gated bloodpool study, a radioisotope is administered to the patient and the patient's heart is imaged at an appropriate position (typically, 45 degrees LAO). For determination of, e.g., the patient's ejection fraction, it is conventional to identify the boundaries of the patient's left ventricle at various points in the patient's cardiac cycle. (The details of gated bloodpool studies and computation of ejection fractions are not set forth here; they are known to persons skilled in the art.)

Such an identification is difficult to make because the boundary of the left ventricle is not sharply defined in a nuclear medicine image. It is therefore necessary to use subjective judgement in determining where this boundary is located. Consequently, two different diagnosticians might have different assessments of a patient's ejection fraction even though both assessments are based on the same data. Indeed, since a single diagnostician may place the left ventricle at different locations at different times, that diagnostician may not even produce consistent assessments from the same data. It would obviously be advantageous to reduce, as much as possible, the subjective element in such determinations. Additionally, because a gated bloodpool study consists of multiple frames of images (typically, 16 to 32 frames), it is a tedious process to manually draw the boundary for each one of the frames of a study. It would obviously be advantageous to automate this process.

The following detailed description of preferred embodiments of the invention is based upon experiments conducted on 75 clinical examinations including more than 1000 frames of gated bloodpool images, which were acquired by different technicians in different hospitals on different types of heart conditions. The description concentrates upon identification of the boundary of the left ventricle because most quantitative assessments, such as ejection fraction, are referenced to it. However, as is described in more detail below, there is no reason why the invention could not be used to identify the boundary of the right ventricle.

Figure 1:
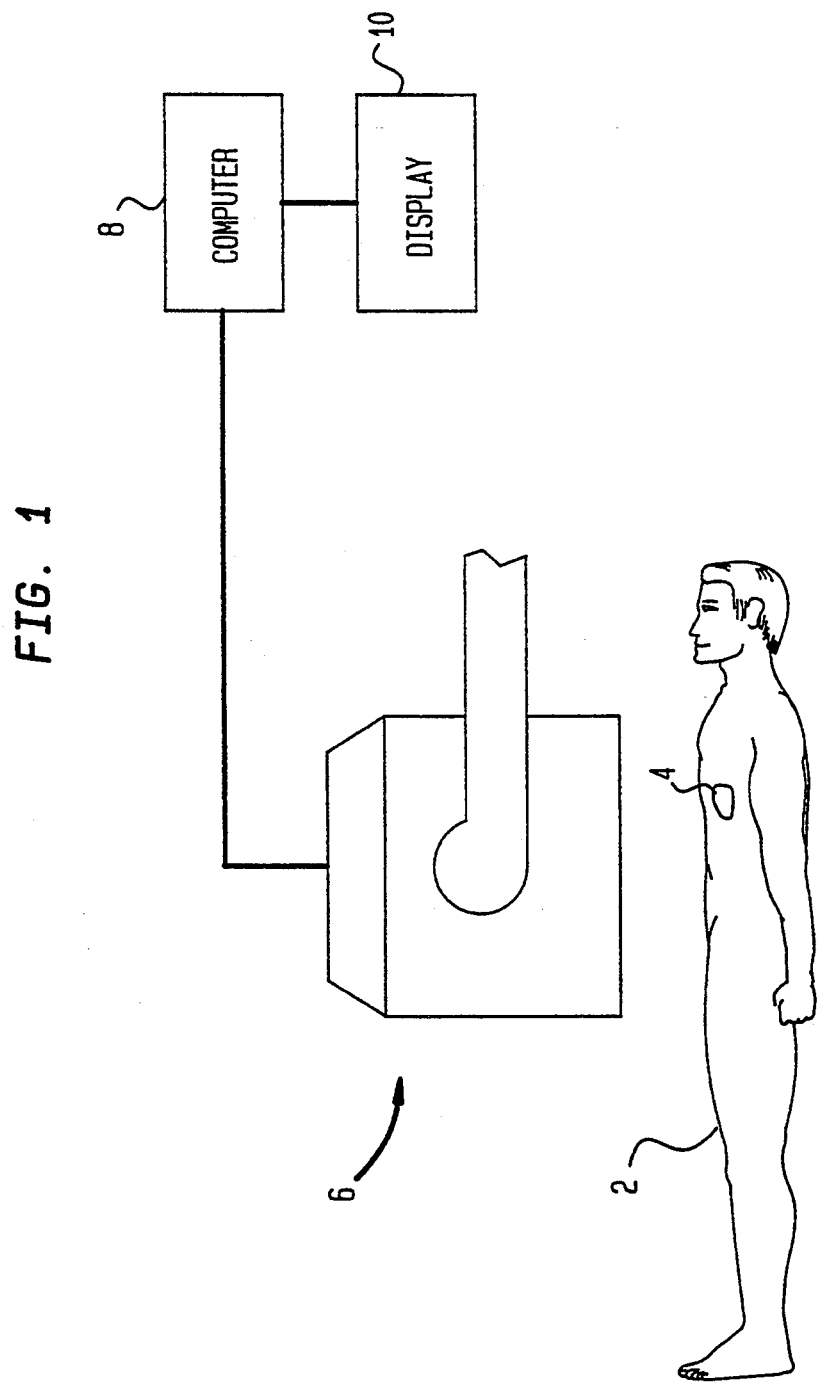
FIG. 1 is a schematic illustration of apparatus used to carry out a gated bloodpool study.

Initially, and as is shown in FIG. 1, a gated bloodpool study is conducted upon a patient 2. In such a study, a radioisotope is administered to the patient 2 and the heart 4 of the patient 2 is imaged using a scintillation camera generally indicated by reference numeral 6. A number of frames of planar images collected by the camera 6 is routed to a computer 8, and the planar image itself may be displayed upon a display 10.

In the normal case (see FIG. 2) the planar image is a two dimensional picture. However, it is also possible to treat the image as a three-dimensional graph, wherein the X and Y axes represent the Cartesian coordinates of a pixel in the image and the Z axis represents the intensity of the image at that pixel. (It will be understood that the intensity of the image at a particular pixel is a function of the number of detected scintillation events which relate to the location of that pixel in the patient 2.) FIG. 3 is such a version of the FIG. 2 image.

Figure 2:
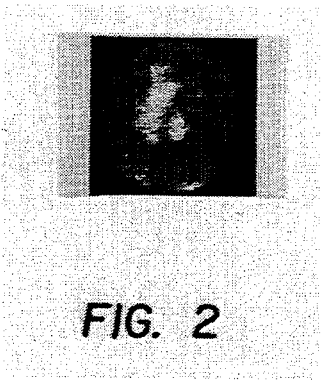
FIG. 2 is a planar image of a patient's heart taken at an angle of 45 degrees Left Anterior Oblique (LAO)
Figure 3:
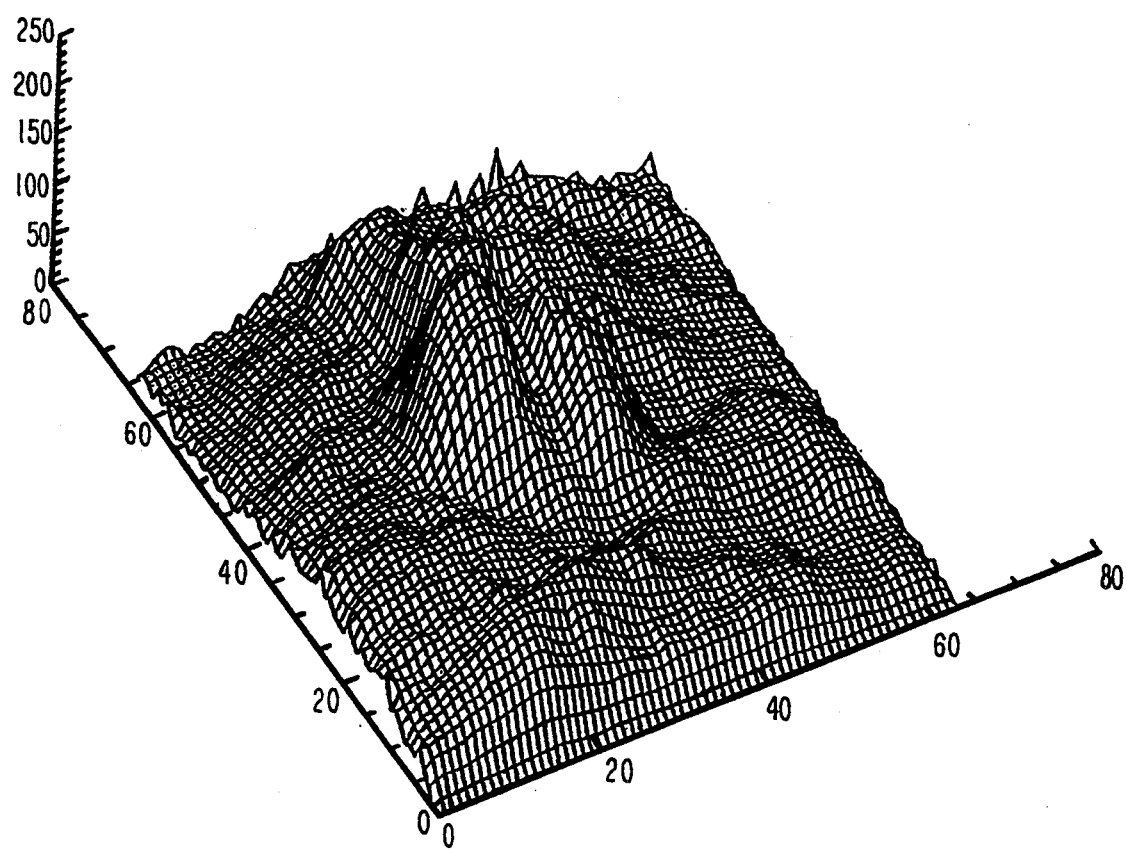
FIG. 3 is a three dimensional graph of FIG. 2 in which image intensity is shown on the Z axis.
Figure 4:
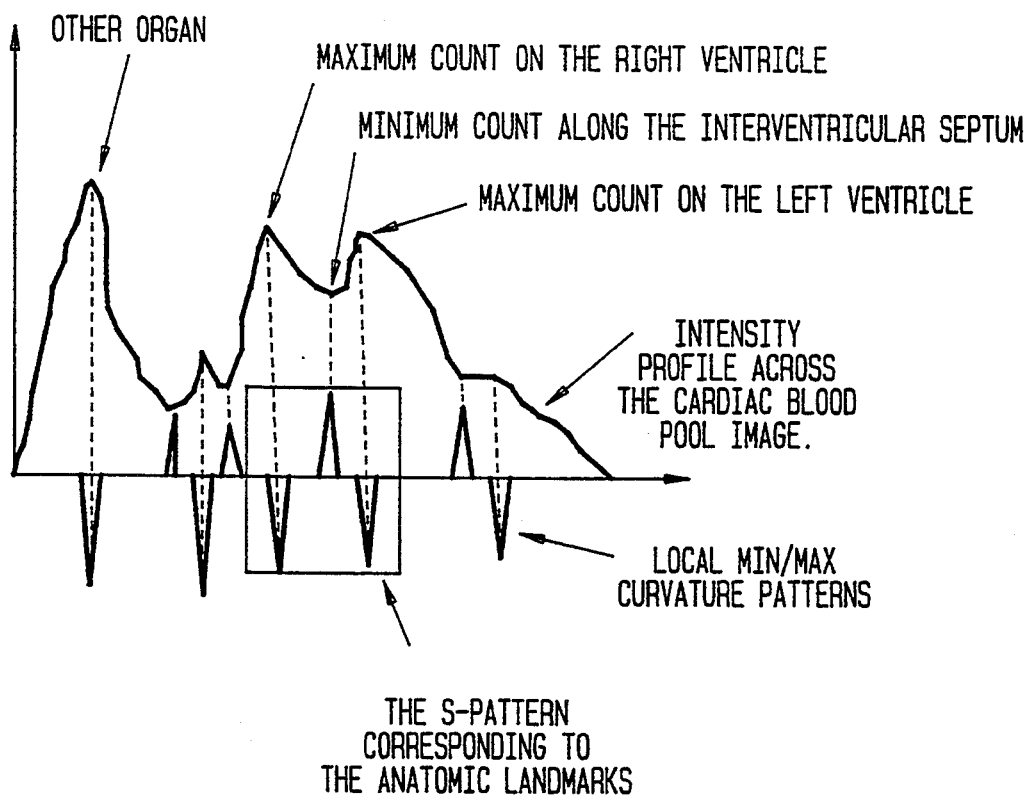
FIG. 4 shows a horizontal scan line across the FIG. 2 image and the resulting localizations of local intensity maxima and minima based upon a local minimum and maximum curvature pattern.
Figure 5:
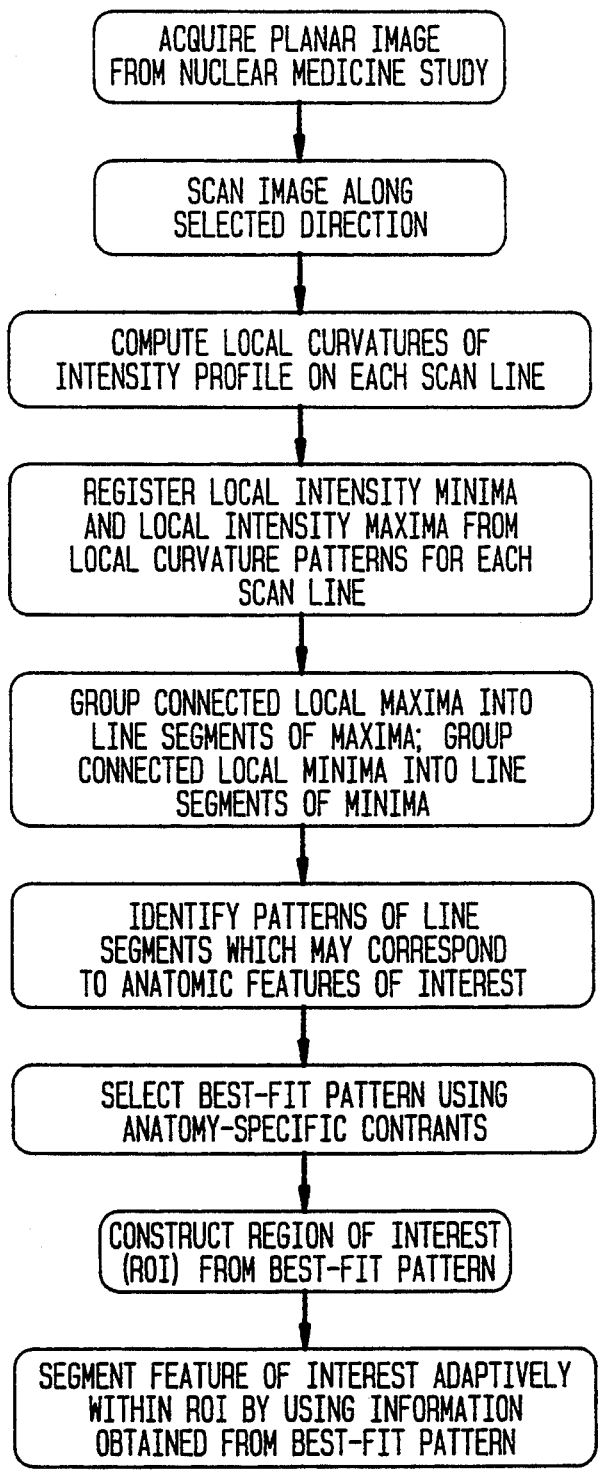
FIG. 5 is a flow chart in accordance with the preferred embodiment of the invention.

In accordance with the preferred embodiment of the invention—see FIG. 4—the FIG. 2 image is scanned with a straight line which is parallel to the X axis. At any X position of this line, there will be a particular intensity value which can be treated as a Z value in the FIG. 3 graph, and there will be a plurality of local maxima and minima of Z. The local curvatures of the profile of this scan line (the profile of the scan line is the curve formed by all Z values as a function of X position) can be so computed that local minimum curvatures (negative peaks) precisely correspond to the local maximum points of the profile, the local maximum curvatures (positive peaks) precisely correspond to the local minimum intensity points of the profile, and so that the remaining points of the profile have zero curvature values. Thus, when such a computational scheme is utilized, the original nuclear medicine image is mapped to a local curvature image where only local maxima and minima are represented by nonzero values. If the heart is located in the image and the scan line crosses it, some of these local maxima and minima will correspond to anatomical features of the heart. For example, as is shown in FIG. 4, there is a "maximum-minimum-maximum" pattern which has been empirically demonstrated to generally correspond to the long axis of the right ventricle, the interventricular septum, and the long axis of the left ventricle.

In accordance with the preferred embodiment of the invention, (which is based upon image data with a typical size of 64 by 64 pixels and prescaled into an intensity range Of 0 to 255) local minima are correlated for connectedness and where they should be connected, are connected with each other, and local maxima are correlated for connectedness and where they should be connected, are connected with each other. Such correlation is easy to visualize; when a local maximum in one scan line is immediately adjacent a local maximum in the immediately previous line, the two maxima can be taken as part of the same line segment; if the current local extreme is immediately adjacent the end of a line segment composed of extremes of the same kind, the current local extreme is connected to the end of the line segment and itself becomes the end of a one-pixel-longer line segment.) Consequently, such correlated local maxima and minima can be grouped into line segments of local maxima and line segments of local minima, respectively. (These line segments are, for computational convenience, chosen to be one pixel wide.) To determine which line segments correspond to anatomical landmarks, constraints are established in accordance with the anatomical features of interest. In the present instance, the system initially "looks" for patterns in which a line segment composed of local minima intervenes along the X coordinate direction between two line segments each composed of local maxima. (Hereinafter, such a pattern will be referred to as an S-pattern.) After finding all such S-patterns, the system then identifies from all of them the single one which best satisfies additional anatomy-specific constraints which are described below.

In a first step, the system scans each S-pattern line by line along the X direction proceeding from the top down or from the bottom up. Two maximum points and one minimum point are detected by intersections of each scan line with the S-pattern. For each scan line, if these three detected points meet all the following conditions, then the S-pattern is assigned a score of 1 from that scan line, otherwise receiving a score of 0. The conditions are:

a) the distance between adjacent maximum points should be approximately 8% to 50% of the width of the image, b) the distance between one minimum point and its adjacent maximum points should be approximately 3% to 25% of the width of the image, c) the intensity of each of the minimum points should be greater than 30% of the intensity of the most intense point in the image, and d) the difference in intensity between a minimum point and its adjacent maximum points should be greater than 0.8% of the intensity of the most intense point in the image.

The result of this step is that for each S-pattern, there is a total score which equals the sum of the scores of all the scan lines which intersect it. Then, each of the remaining below-listed constraints is applied to each of the S-patterns. The system then selects the single S-pattern which a) meets all of the below-listed constraints and b) has the highest above-defined score of all the S-patterns which meet all of the below-listed constraints.

Additional constraints:

2) Each line segment of maxima or minima in the S-pattern under consideration should have a maximum average intensity in comparison with that of its corresponding line segment in other S-patterns. (The average intensity of a line segment is defined to be the sum of the intensities of all pixels along the line segment, divided by the total number of such pixels; in effect, total intensity divided by total length.)

3) Each of the line segments in the S-pattern under consideration should be longer than 5% of the height of the image.

4) Line segments in the S-pattern under consideration should not intersect each other.

5) The positions of the endpoints of the three line segments in the S-pattern under consideration should be consistent.

6) The intensity profile along each of the three line segments in the S-pattern under consideration should be smooth and should not have any deep valleys.

7) The positions, lengths and average intensities of corresponding line segments in the S-pattern under consideration should not change rapidly from one frame to the next.

Figure 6:
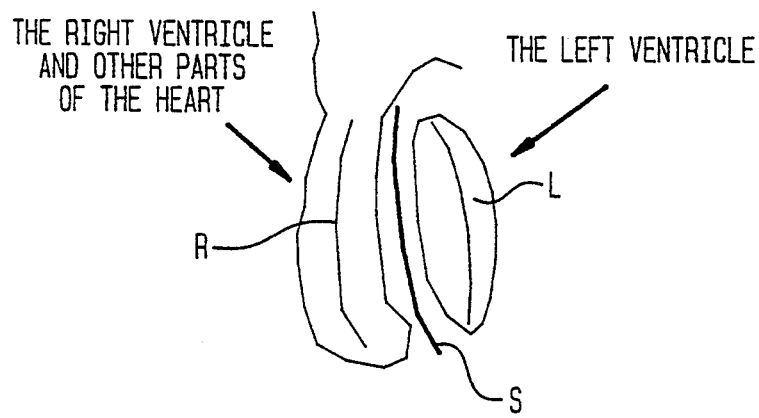
FIG. 6 shows lines which generally correspond to a patient's ventricles and interventricular septum, derived using the preferred embodiment of the invention.

The single S-pattern which satisfies the above constraints 2)–7) and which has the highest score is taken to be the above-referenced "maximum-minimum-maximum" pattern which represents the geometry of the heart. In this S-pattern, the rightmost line segment composed of maxima is taken to represent the long axis of the left ventricle, the leftmost line segment composed of maxima is taken to represent the long axis of the right ventricle, and the middle line segment (which is composed of minima) is taken to represent the interventricular septum. Thus, this step produces three nonintersecting line segments such as are shown in FIG. 6; the leftmost one R generally corresponding to the long axis of the right ventricle, the middle one S generally representing the interventricular septum, and the rightmost one L generally corresponding to the long axis of the left ventricle.

Figure 7:
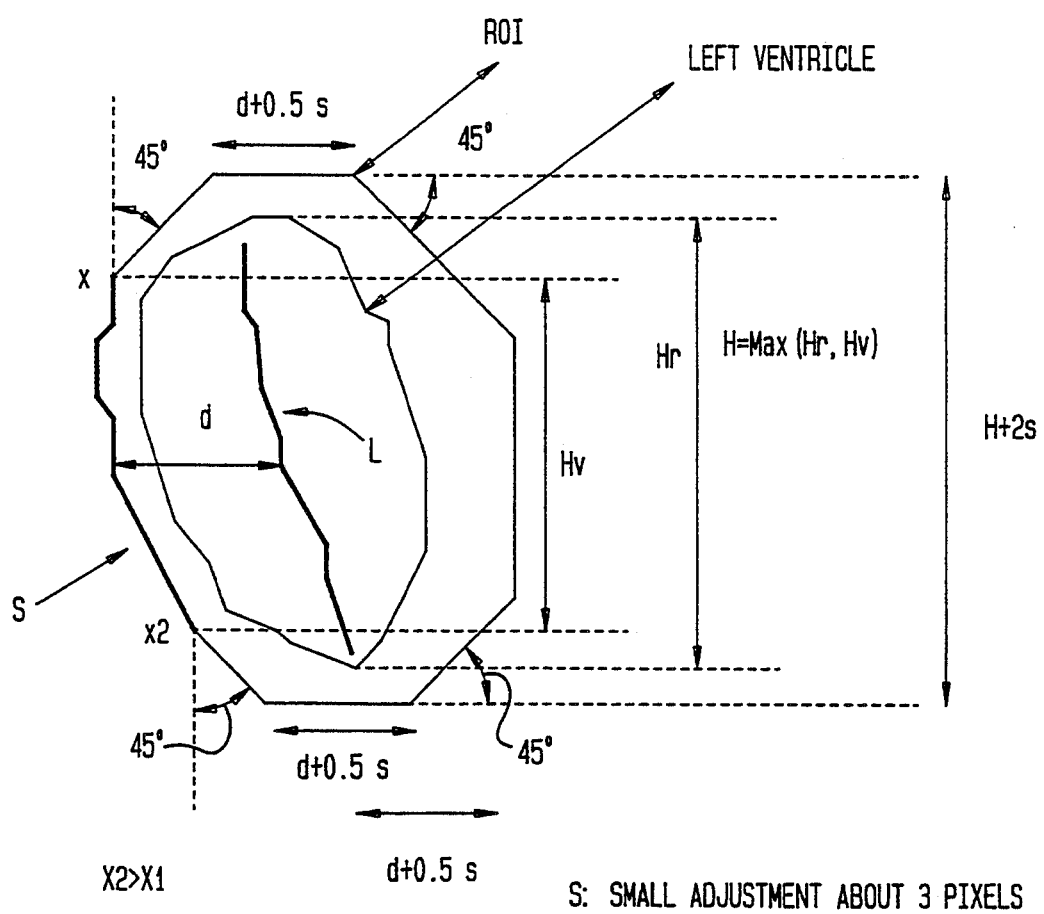
FIG. 7 show how a region of interest for locating the left ventricle is determined in accordance with the preferred embodiment of the invention.

To locate the boundary of the left ventricle in accordance with the preferred embodiment of the invention, a Region of Interest (ROI) is constructed on the basis of the lines which correspond to the interventricular septum and the left ventricle. The definition of the ROI is shown in FIG. 7. As is shown there, the height of the ROI is approximately equal to the height of the septum line or the height of the left ventricle line, whichever is greater. The width of the bottom of the ROI is approximately twice the maximum distance between the detected septum line and the detected left ventricle line. The left edge of the ROI is the septum line. The details of the top, the bottom, and the right boundaries of the ROI are shown in FIG. 7. The thus-defined ROI isolates only the left ventricle.

Because the ROI only encompasses a relatively small area and isolates only the left ventricle, it is comparatively easy to locate the boundary of the left ventricle. This is done by using intensity information along the line segment which corresponds to the interventricular septum; the intensity along the detected interventricular septum represents the radionuclide activities in heart muscles which immediately adjoin the left ventricular blood pool.

In the preferred embodiment, the boundary of the left ventricle is determined adaptively. The maximum intensity along the line segment which corresponds to the interventricular septum is SMAX, the minimum intensity is SMIN, and the length of the line segment is LNT. (Usually, SMAX is located at the top of the line segment and SMIN is located at the bottom of the line segment.) In accordance with the preferred embodiment, an adjustment ratio ADJ is set to equal (SMAX-SMIN)/LNT. Then, the image within the ROI is scanned line-by-line, from the top down. For the Nth scan line an adaptive threshold value is set to equal (SMAX-ADJ,N), where N ranges from 0 (top of the ROI) to the bottom of the ROI in integral increments. If the intensity of the pixel on the scan line is greater than the current adaptive threshold, the pixel is treated as belonging to the left ventricular blood pool region. Thus, the left ventricular blood pool region within the ROI is adaptively segmented and a one-pixel-wide edge of the blood pool is determined by labeling the boundary of the segmented region.

The above description has concentrated upon the left ventricle because this is the feature which is conventionally monitored in, e.g., ejection fraction computations. While there is no theoretical reason why the boundary of the right ventricle could not be determined in a similar fashion, the task is relatively complicated because there is a substantial overlap between the right ventricle and the right atrium in a 45 degree LAO view and this is usually the position of choice in cardiac studies (because in this position, the left ventricle is separated from the rest of the heart and this is best for cardiac bloodpool studies).

In further accordance with the invention, it is possible to apply the preferred embodiment of the invention in real time shortly after the study has been commenced. This is because the preferred embodiment is self-adapted to different distributions of data, and the anatomical landmarks can be steadily identified both from low statistics data (average of 13 counts per pixel) and high statistics data (average of several hundred counts per pixel). Another reason why real time application is possible is that the distribution of data (e.g. the locations of intensity maxima and minima) is a function of the structure of the heart and not the duration of the study. Thus, even if there is insufficient data to form an image for diagnosis, it is possible to locate the left and right ventricles and the interventricular septum relative to each other.

Figure 8:
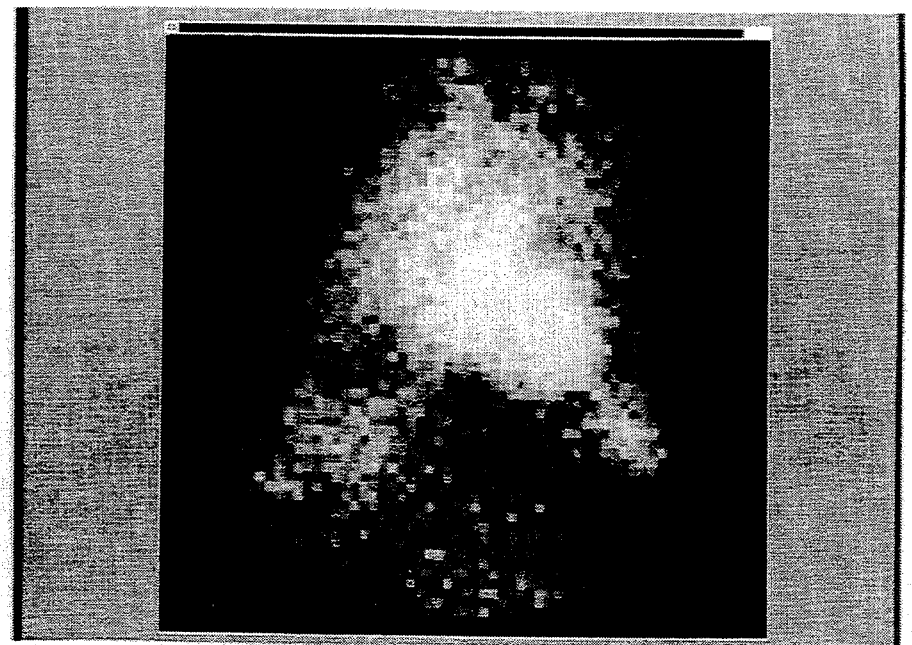
FIGS. 8 and 9 show, respectively, a low-statistics image of a patient's heart taken at approximately 30 degrees LAO and the anatomical landmarks detected in the image in accordance with the preferred embodiment of the invention.
Figure 9:
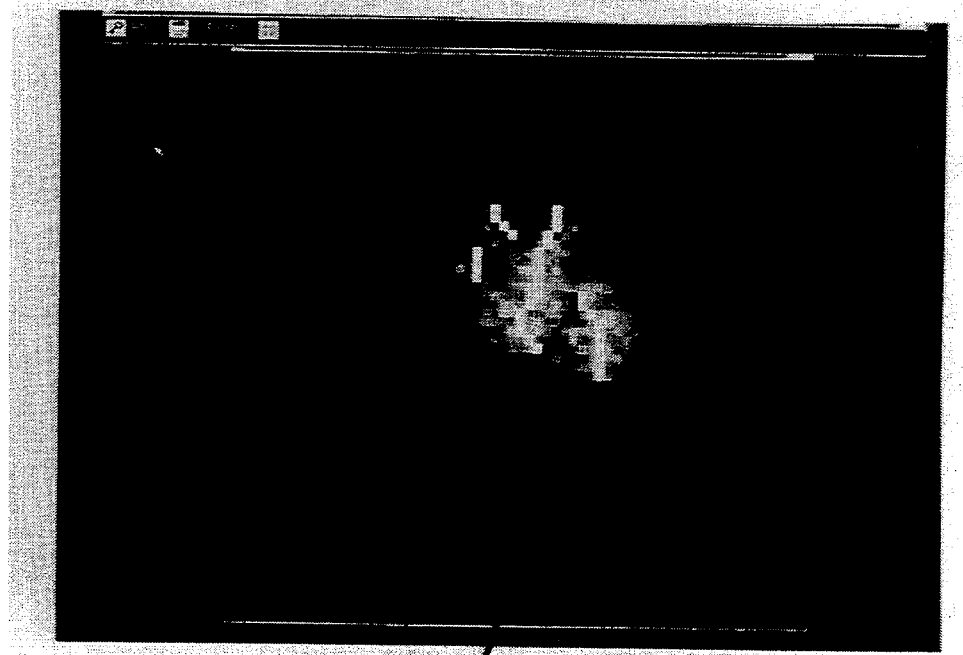
Figure 10:
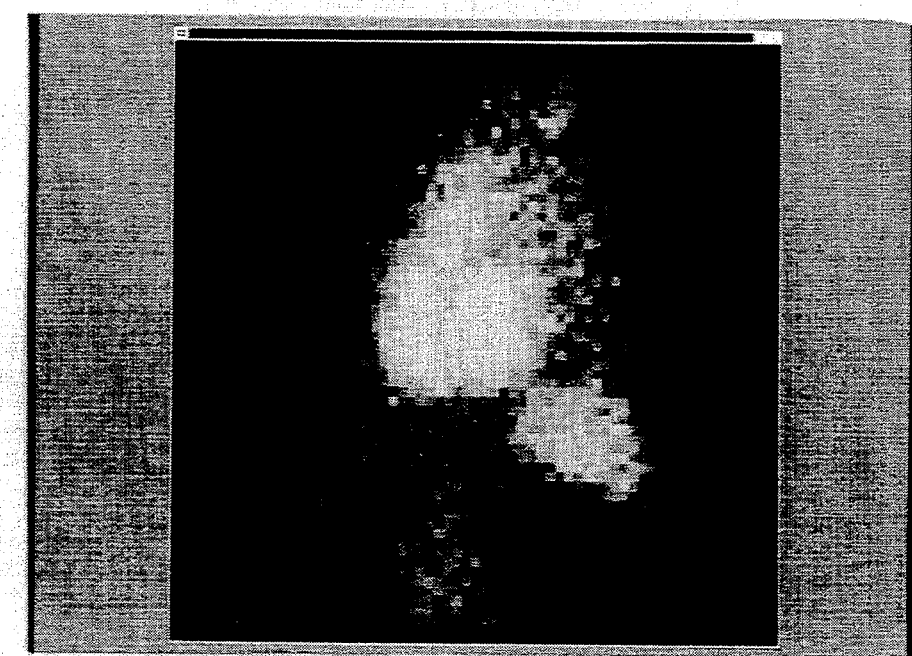
FIGS. 10 and 11 show, respectively, a low-statistics image of a patient's heart taken at approximately 50 degrees LAO and the anatomical landmarks detected in the image in accordance with the preferred embodiment of the invention.
Figure 11:
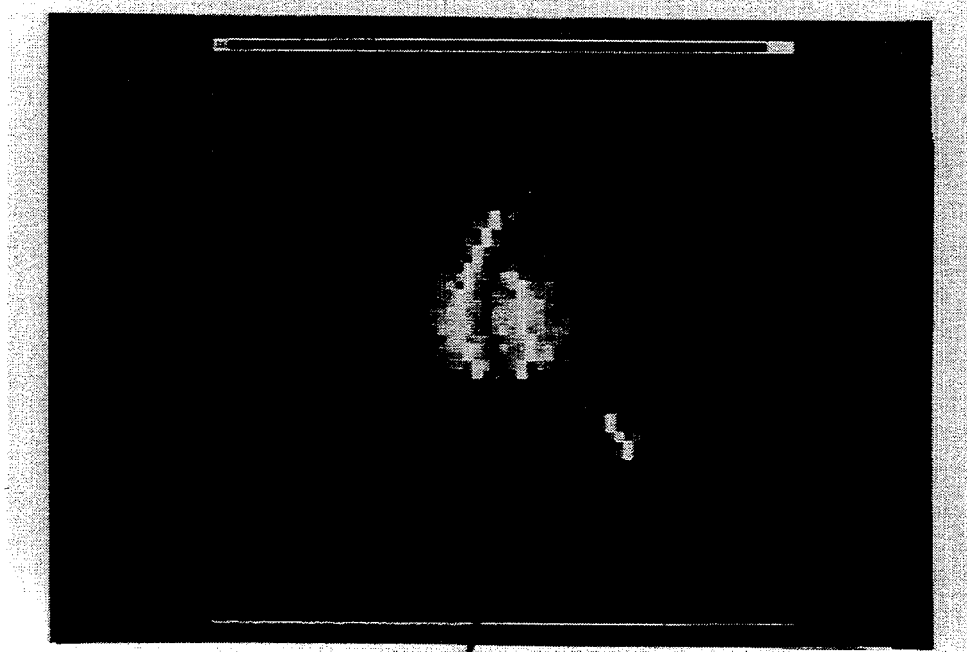
Figure 12:
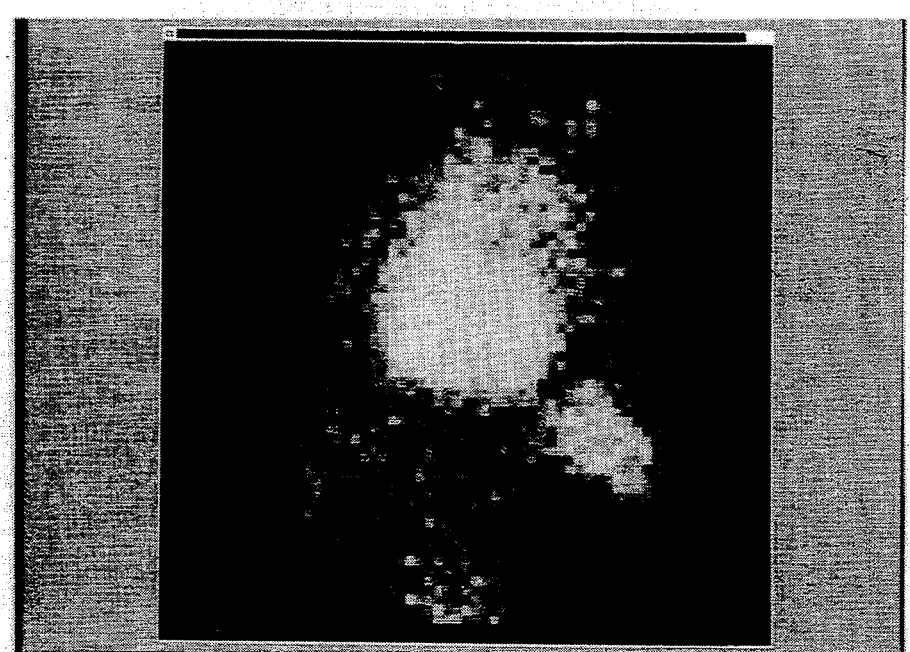
FIGS. 12 and 13 show, respectively, a low-statistics image of a patient's heart taken at approximately 40 degrees LAO and the anatomical landmarks detected in the image in accordance with the preferred embodiment of the invention.
Figure 13:
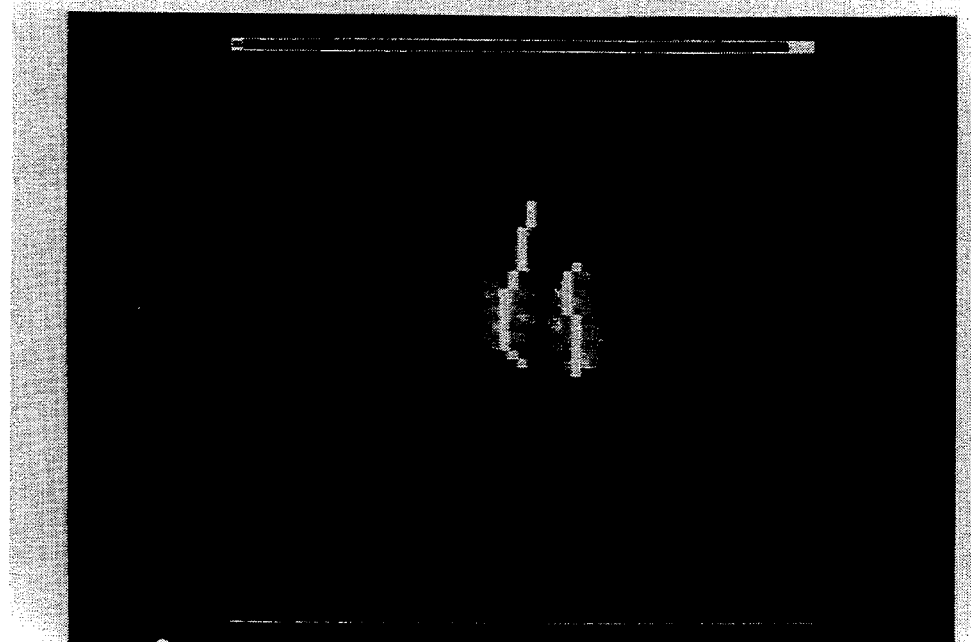

The consequence of this is illustrated in FIGS. 8–17, which are formed using clinical gated SPECT data which were acquired for approximately one real-time minute per camera stop. In FIG. 8, which is taken at approximately 30 degrees LAO, the right ventricle partially overlaps the left ventricle. FIG. 9 shows the anatomical landmarks detected from FIG. 8. In FIG. 10, which is taken at approximately 50 degrees LAO, the right ventricle is partially overlapped by the left ventricle. FIG. 11 shows the corresponding anatomic landmarks detected from FIG. 10. In FIG. 12, which is taken at approximately 40 degrees LAO, the right ventricle is relatively clearly separated from the left ventricle. FIG. 13 shows the corresponding anatomic landmarks detected from FIG. 12.

Figure 14:
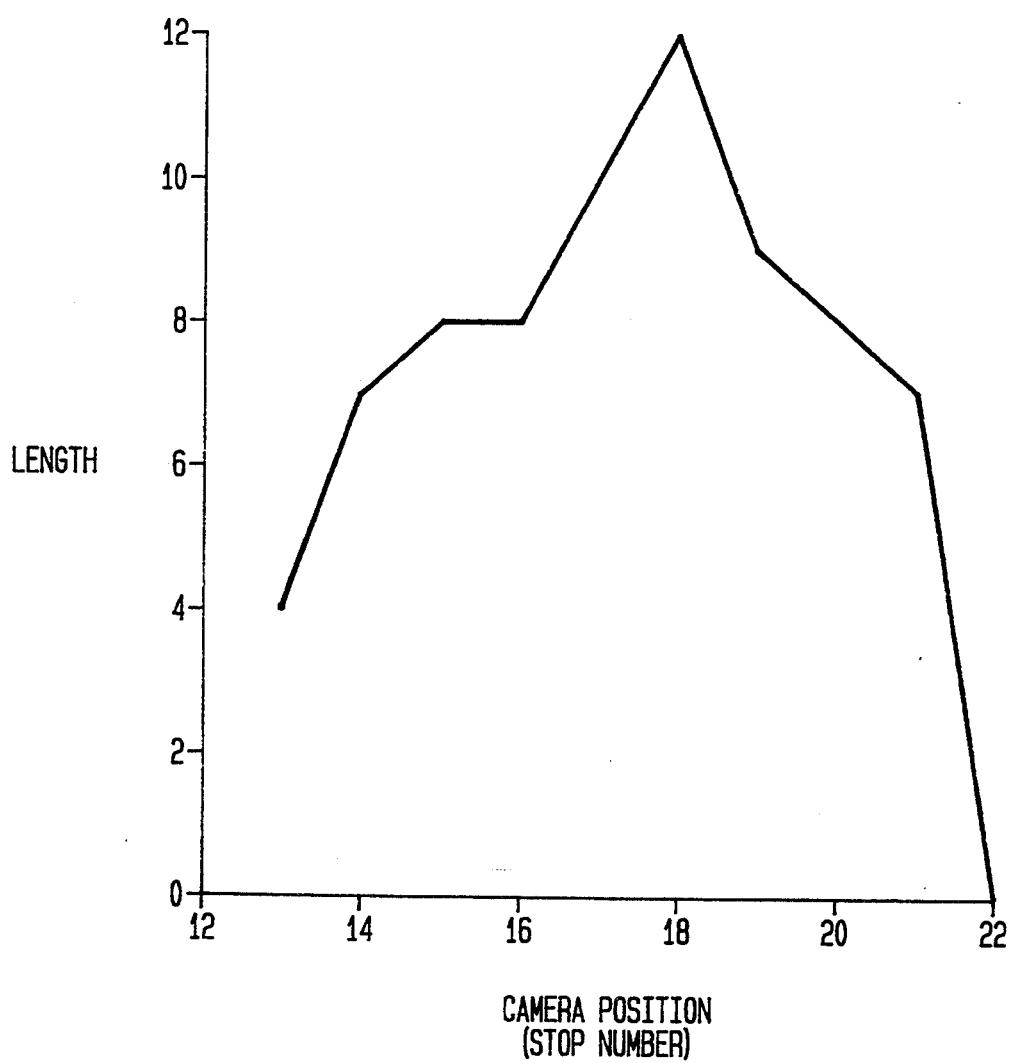
FIG. 14 shows how the camera stop position affects the detected length of the interventricular septum as determined in accordance with the preferred embodiment of the invention.
Figure 15:
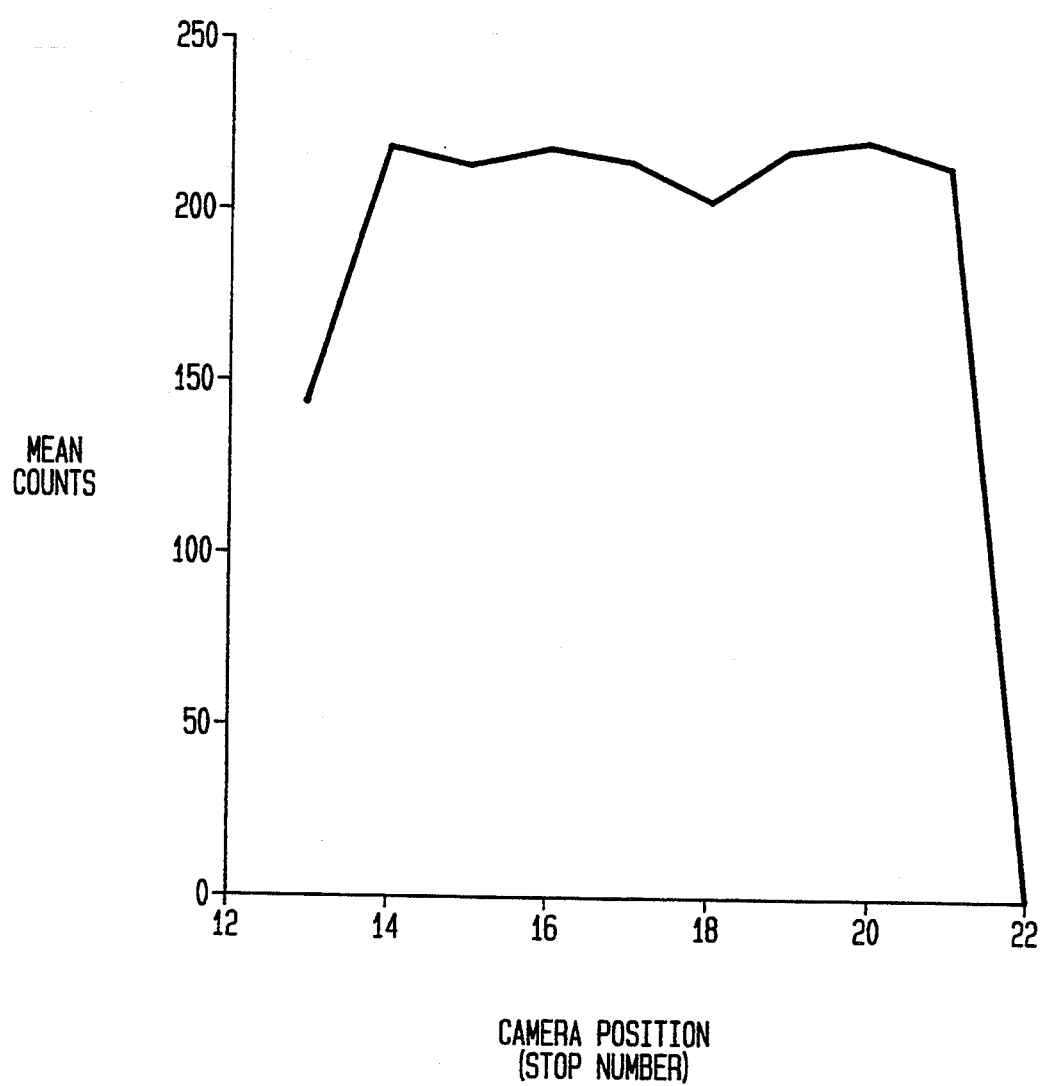
FIG. 15 shows how the camera stop position affects the detected average intensity of pixels along the interventricular septum as determined in accordance with the preferred embodiment of the invention.
Figure 16:
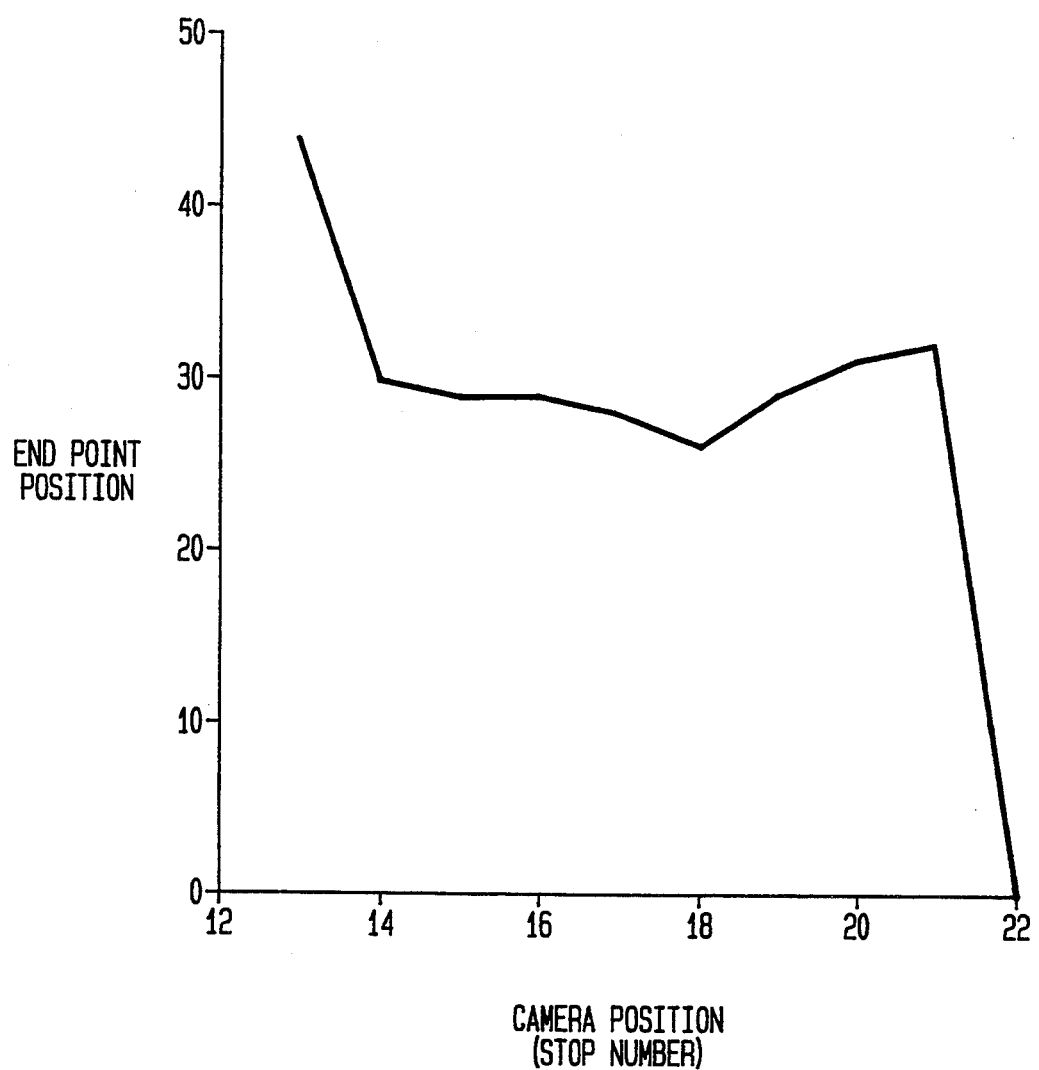
FIG. 16 shows how the camera stop position affects the detected end point position of the interventricular septum as determined in accordance with the preferred embodiment of the invention.
Figure 17:
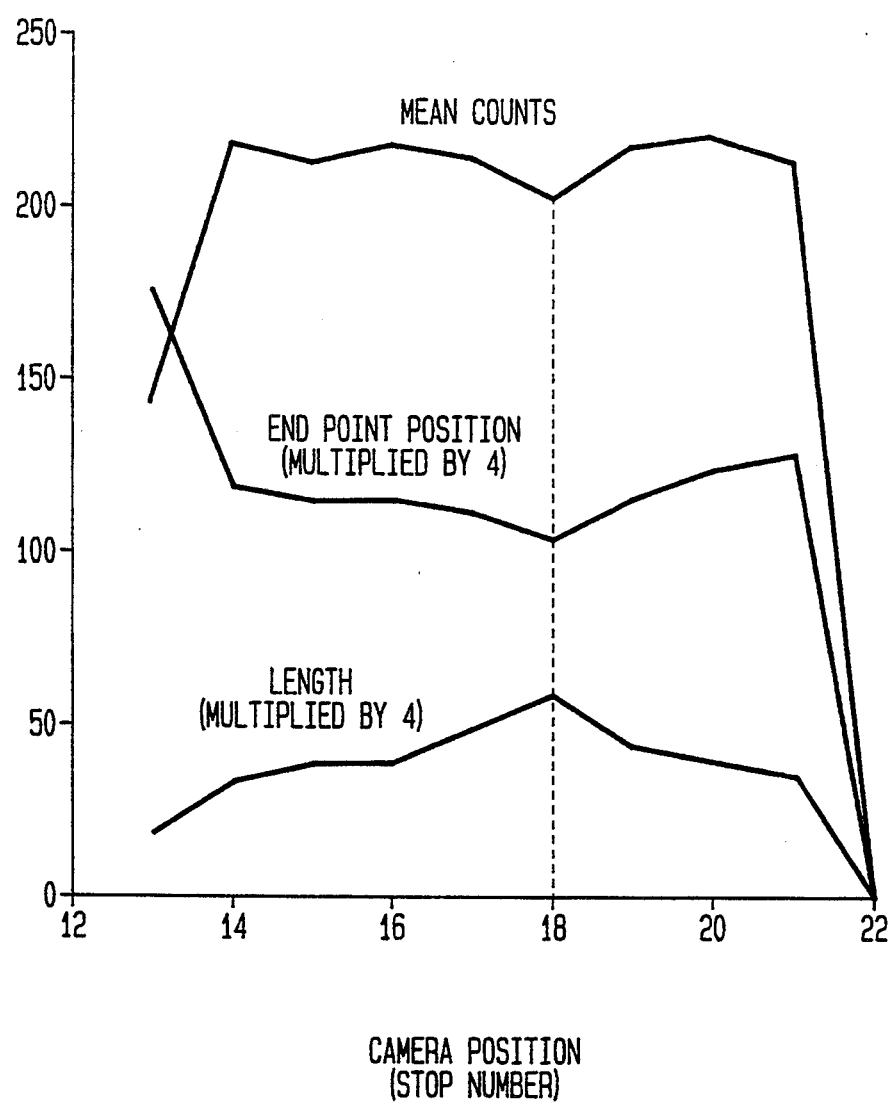
FIG. 17 shows the correlations between the relationships displayed in FIGS. 14–16.

Consequently, the positioning of the camera with respect to the patient's heart can be deduced from the spatial relationships and parameter relationships (e.g. direction, length, average intensity and shape) between the atrial, ventricular and septal line segments, as will become evident from an examination of FIGS. 14–17. These figures use the parameter relationships of the detected interventricular septum line as an example, and they relate the parameter of interest to the position of the camera (expressed as the camera stop number). The detected interventricular septum line is indicated in each of FIGS. 9, 11 and 13. If a camera is optimally positioned (such that there is a maximal separation between the left ventricle and the right ventricle) then the average intensity (or event counts) in the interventricular septum line should be at a minimum. This is because the interventricular septum is not overlapped with any portion of either the left or right ventricular blood pools. Additionally, with the camera in the optimal position, the length of the detected interventricular septum should be at a maximum because the septum is fully "visible". Therefore, the position of the point of the detected interventricular septum should be relatively lower. FIGS. 14–16 show the actual measurements of these three parameters (length, average intensity and end point position vs. camera stop position number) for the above-mentioned SPECT data. FIG. 17 shows how these three parameters correlate with each other, and clearly suggests that camera stop position number 18 (frame 18) is the optimal camera position. This result is consistent with the optimal position determined independently by an experienced clinic technician who was unaware of the above analysis. Based upon the combination of the above-mentioned spatial relationships between the detected landmarks, the current camera position can be deduced and the optimal camera position can be inferred. This allows the technician to reposition the patient to avoid finishing the study at a suboptimal angle.

Figure 18:
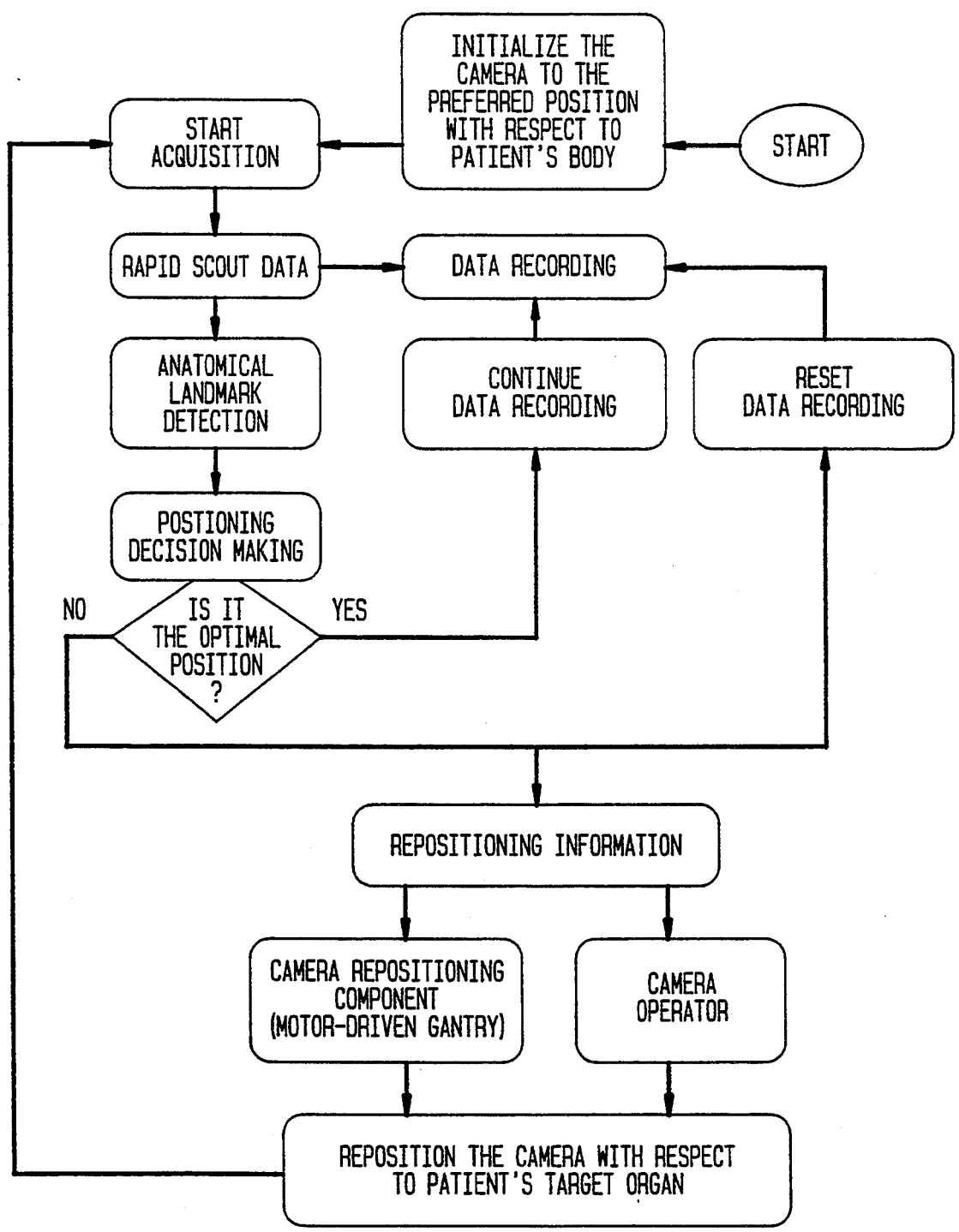
FIG. 18 is a flow chart in accordance with the preferred embodiment of the invention in which a scintillation camera detector is automatically positioned in a clinical environment.

Another consequence of this is, in accordance with the preferred embodiment of the invention, the automatic adjustment of camera position to optimize the study which is being conducted. In a conventional motor-driven camera gantry which is capable of performing SPECT studies (such as the ORBITER and DIACAM camera gantries manufactured by Siemens Gammasonics, Inc.) the detector is stepped around the patient's body axis and an image is acquired at each position. If such a gantry is connected with, and therefore controlled by, a computer programmed in accordance with the present invention, the detector can be set up at an initially preferred position and the study commenced. After minimum sufficient data (rapid scout data) has been accumulated to permit the position of the detector relative to the patient's heart to be determined, the camera may be stepped to a new suggested position determined by the computer in accordance with the present invention. Then, a second set of data can be collected and a new camera position relative to the heart can be determined. The computer can then suggest a final and optimized camera position by comparing the two sets of information which have been accumulated. If necessary, this process can then be repeated until an optimum position has been reached. This is shown in FIG. 18.

Although a preferred embodiment has been described above, the scope of the invention is limited only by the following claims:

1. A method of identifying, from image data acquired in a nuclear medicine study of a patient's body, an anatomical feature of interest, comprising:
   conducting a nuclear medicine study and thereby acquiring an image of the feature, said image including, for each image pixel, an intensity representing a number of detected scintillation events which corresponds to the location of that pixel in the patient's body;
   establishing, on the basis of the feature to be identified, a scan curve and a scan direction;
   scanning the image with the scan curve along the scan direction and registering, for each location of the scan curve, the pixels with local intensity maxima and minima;
   grouping together, in accordance with their connectedness, some of such registered pixels, to form maxima line segments composed exclusively of pixels with local intensity maxima and minima line segments composed exclusively of pixels with local intensity minima; and
   determining which of said line segments correspond with the feature by identifying whether said line segments satisfy constraints which have been empirically determined to relate to the feature.

2. The method of claim 1, wherein the feature is the interventricular septum of the heart, the scan curve is a straight line which is generally normal to the interventricular septum and the scanning direction is generally parallel to the interventricular septum.

3. The method of claim 1, further comprising the step of creating, from the line segments which have been determined to correspond to the feature, a region of interest within the image.

4. The method of claim 3, further comprising the step of searching the region of interest for at least one predetermined anatomical feature.

5. The method of claim 4, wherein the feature is the boundary of the left ventricle.

6. A method of identifying, from image data acquired in a nuclear medicine study of a patient's body, an anatomical feature of interest, comprising:
   conducting a nuclear medicine study and thereby acquiring an image of the feature, said image including, for each image pixel, an intensity representing a number of detected scintillation events which corresponds to the location of that pixel in the patient's body;
   mapping the image to a local curvature image wherein only pixels with local intensity maxima and minima have non-zero values;
   grouping together, in accordance with their connectedness, at least some of such non-zero value pixels, to form maxima line segments composed exclusively of pixels with local intensity maxima and minima line segments composed exclusively of pixels with local intensity minima; and
   determining which of said line segments correspond with the feature by identifying whether said line segments satisfy constraints which have been empirically determined to relate to the feature.

7. A method of optimizing the position of a scintillation camera detector with respect to a target organ within the body of a patient and thereby optimizing image data acquired in a nuclear medicine study, comprising:
   acquiring a first image of the target organ at an initially preferred position of the detector with respect to the patient's body, said first image including, for each image pixel, an intensity representing a number of detected scintillation events which corresponds to the location of that pixel in the patient's body;
   establishing, on the basis of the target organ, a scan curve and a scan direction;
   scanning the first image with the scan curve along the scan direction and registering, for each location of the scan curve, the pixels with local intensity maxima and minima;
   grouping together, in accordance with their connectedness, some of such registered pixels, to form maxima line segments composed exclusively of pixels with local intensity maxima and minima line segments composed exclusively of pixels with local intensity minima;
   determining which of said line segments correspond with anatomical features of the target organ by identifying whether said line segments satisfy constraints which have been empirically determined to relate to said features;
   ascertaining, from the line segments which have been so determined to correspond to the feature, a current position of the scintillation camera detector with respect to said target organ;

establishing a second preferred position of the scintillation camera detector with respect to the target organ;

acquiring a second image of the target organ at said second preferred position of the detector with respect to the patient's body, said second image including second image pixels and for each second image pixel, an intensity representing that number of detected scintillation events which correspond to the location of that pixel in the patient's body;

scanning the second image with the scan curve along the scan direction and registering, for each location of the scan curve, the second image pixels with local intensity maxima and minima;

grouping together, in accordance with their connectedness, some of such registered second image pixels, to form second image maxima line segments composed exclusively of second image pixels with local intensity maxima and second image minima line segments composed exclusively of second image pixels with local intensity minima;

determining which of said second image line segments correspond with anatomical features of the target organ by identifying whether said second image line segments satisfy constraints which have been empirically determined to relate to said features; and ascertaining, from the second image line segments which have been so determined to correspond to the feature, a current position of the scintillation camera detector with respect to said target organ.

8. The method of claim 7, further comprising the step of determining which of the first and second positions is better for conducting the study.

9. The method of claim 7, further comprising the step of automatically moving the scintillation camera detector to an optimized position determined by comparing information acquired at the first position with information acquired at the second position.

10. A method of identifying a patient's cardiac ventricles and interventricular septum from image data acquired in a gated cardiac bloodpool study of the patient's heart, comprising:

acquiring a nuclear medicine image of the heart wherein the interventricular septum extends generally vertically from the top of the image to the bottom of the image, said image including, for each image pixel, an intensity representing a number of detected scintillation events which corresponds to the location of that pixel in the patient's heart;

scanning the image with a horizontally extending line which is moved in a direction that is generally parallel to the patient's interventricular septum and registering, for each vertical location of the horizontally extending scan line, the pixels with local intensity maxima and minima;

grouping together, in accordance with their connectedness, some of such registered pixels, to form maxima line segments composed exclusively of pixels with local intensity maxima and minima line segments composed exclusively of pixels with local intensity minima;

identifying S-patterns wherein a minima line segment intervenes, along the horizontally extending scan line, between two maxima line segments; and extracting, from all such identified S-patterns, and in accordance with constraints which have been empirically determined to relate to the interventricular septum and the cardiac ventricles, that single S-pattern which best corresponds to the long axes of the ventricles and the intervening interventricular septum.

11. The method of claim 10, wherein said scanning and registration step includes the step of mapping the image to a local curvature image in which only local maxima and minima have non-zero values.

12. The method of claim 10, further comprising the steps of determining, within the image and from the line segments in said single S-pattern, a region of interest which includes only the left ventricle.

13. The method of claim 12, further comprising the steps of adaptively segmenting the left ventricle within the region of interest and creating a graphical plot of the boundary of the left ventricle.

14. The method of claim 13, further comprising the step of superposing the plot upon the image.

15. Apparatus for identifying a patient's cardiac ventricles and interventricular septum from image data acquired in a gated cardiac bloodpool study of the patient's heart, comprising:

scintillation camera means for acquiring and storing a nuclear medicine image of the heart wherein the interventricular septum extends generally vertically from the top of the image to the bottom of the image, said image including, for each image pixel, an intensity representing the number of detected scintillation events which correspond to the location of that pixel in the patient's heart; and computer means, said computer means comprising
means for scanning the image with a horizontally extending line which is moved in a direction that is generally parallel to the patient's interventricular septum and registering, for each vertical location of the horizontally extending scan line, the pixels with local intensity maxima and minima, means for grouping together, in accordance with their connectedness, some of such registered pixels, to form maxima line segments composed exclusively of pixels with local intensity maxima and minima line segments composed exclusively of pixels with local intensity minima, means for identifying S-patterns wherein a minima line segment intervenes, along the horizontally extending scan line, between two maxima line segments, and means for extracting, from all such identified S-patterns, and in accordance with constraints which have been empirically determined to relate to the interventricular septum and the cardiac ventricles, a single S-pattern which best corresponds to the long axes of the ventricles and the intervening interventricular septum.

16. The apparatus of claim 15, wherein said computer means further includes means for mapping the image to a local curvature image in which only local maxima and minima have non-zero values.

17. The apparatus of claim 15, wherein said computer means further includes means for determining, within the image and from the line segments in said single S-pattern, a region of interest which includes only the left ventricle.

18. The apparatus of claim 17, wherein said computer means further includes means for adaptively segmenting the left ventricle within the region of interest and creating a graphical plot of the boundary of the left ventricle.

19. The apparatus of claim 18, further comprising a display and means for displaying, upon the display, a superposition of the plot and the image.

* * * * *